UNITED STATES PATENT OFFICE.

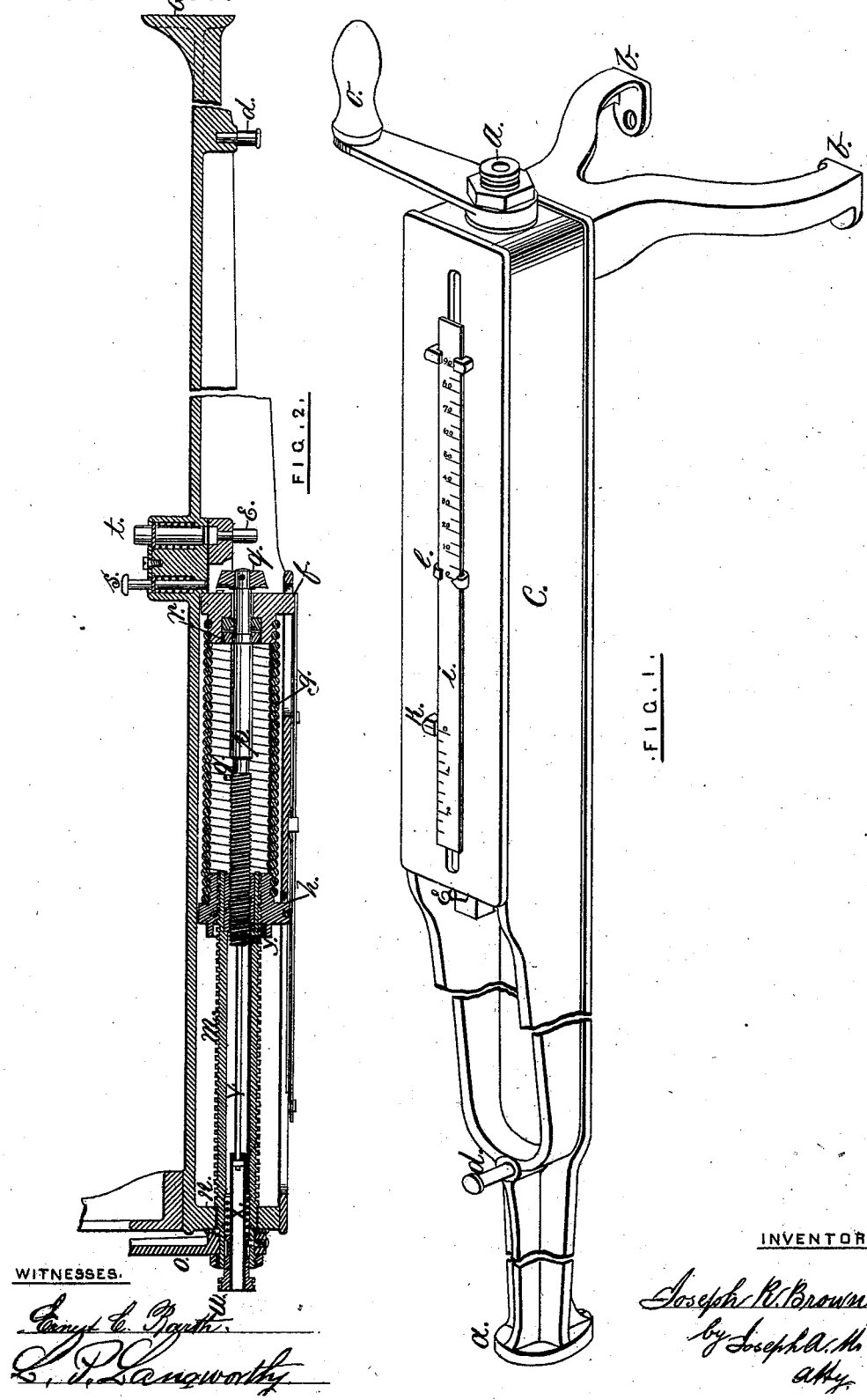

JOSEPH R. BROWN, OF PROVIDENCE, RHODE ISLAND.

IMPROVEMENT IN YARN-TESTERS.

Specification forming part of Letters Patent No. 184,830, dated November 28, 1876; application filed July 17, 1876.

*To all whom it may concern:*

Be it known that I, JOSEPH R. BROWN, of the city and county of Providence, State of Rhode Island, have invented new and useful Improvements in Yarn-Testers; and I hereby declare that the following is a full, clear, and exact description of the same, reference being had to the accompanying drawings, forming part of this specification.

Figure 1 is a perspective view of my improved yarn-tester, the lower part being shown as broken, to bring the whole within the limits of the sheet. Fig. 2 is a longitudinal section through the center of the machine, and shows all the working parts, partly in view and partly in section.

The object of this invention is to produce a convenient, simple, and durable machine or instrument, by which both the strength and stretch of yarns may be accurately tested, to enable the manufacturer to know constantly and with exactness the quality and strength of the yarn produced.

The nature of the invention consists in the peculiar arrangement of a coiled spring with a graduated index-plate and means for securing skeins of yarns and subjecting them to strain, so that the amount of stretch, and also the breaking-strength, of yarn, will be indicated, as will be more fully set forth hereinafter.

The improved yarn-tester shown in the drawings is arranged to be permanently fixed in a vertical position, the foot $a$ resting on the floor and secured to the same, while the brackets $b$ $b$ are secured to the wall, so that the instrument projects sufficiently from the wall to allow the crank $o$ to be readily operated. The pin $d$ is fixed to the lower extension of the case $c$, near the foot $a$, and the pin $e$ is fixed in an extension of the cross-head $f$. When the instrument is in the normal condition, ready to receive the yarn to be tested, the pins $d$ and $e$ are somewhat nearer together than the length of the loop, the object being to facilitate the adjusting of the loop on the pins. Secured to the cross-head $f$ is a coiled spring, $g$, of an ascertained fixed tension, which spring extends upward and is secured to the cross-head $h$. To the lower cross-head $f$ the graduated index $i$ is permanently secured, the lower part being graduated to indicate the stretch of the yarn and the upper part to indicate the breaking-strain of the same. The lower part may be made to represent inches and fractions of inches, and the upper part pounds avoirdupois and fractions of the same; or any other measures of weight and length may be so indicated on the index-plate. The index-plate $i$ moves with the cross-head $f$ past the pointer $k$, the zero-point being reached as soon as the pins $d$ and $e$ are the necessary distance apart to bring the loop of yarn to a firm bearing without strain or stretch, so that all the stretch will be indicated by the index-plate moving upward and past the pointer $k$. $l$ is the pointer secured to the cross-head $h$, and for convenience is in this instrument secured to an arm extending downward so that the pointers are nearer together than the cross-heads $f$ and $h$.

The operation of the instrument when considered thus far would be as follows: When a loop or knot of a given number of threads of yarn is placed on the pins $d$ $e$, and a strain is exerted on the cross-head $h$, then the cross-head $h$, the spring $g$, and the cross-head $f$ will slide upward in the case $c$ until the zero-mark on the index-plate is opposite the pointer $k$.

The yarn is now in that condition when any further strain on the cross-head $h$ will exert both strain and stretch on the yarn. The stretch of the yarn will allow the pins $d$ and $e$ to separate further, and thus allow the cross-head $f$ to slide upward, and with it the index-plate, past the pointer $k$, while the strain exerted overcomes the tension of the spring $g$, and allows the cross-heads $f$ and $h$ to separate; and as the pointer $l$ is secured to the cross-head $h$, and the index-plate $i$ to the cross-head $f$, the distance of this separation will be indicated by the pointer sliding upward on the index-plate until the yarn breaks, thus indicating both the amount of stretch and the breaking-strength of the yarn.

The moment, however, the yarn breaks the spring $g$ will draw the cross-heads $f$ and $h$ together, and it would be difficult to ascertain the exact amount of stretch or strain exerted at the moment the yarn broke.

The object therefore of the other parts in this invention is to retain the positions of the cross-heads, index-plate, and pointer at the point reached at the moment of the breaking of the yarn, so that both the stretch and strain can be conveniently ascertained, and the instrument wound back to its normal point to be ready for another test.

The strain on the cross-head $h$ is exerted by the hollow spindle $m$, secured in a firm bearing between shoulders $n$ at the upper end of the case $c$. To this spindle $m$ the crank $o$ is secured, by which it may be turned.

The spindle $m$ is provided on its outer surface with a screw-thread, which enters a nut or female screw in the cross-head $h$, and as the spindle is firmly held at $n$ by turning the same with the crank $o$ the cross-head $h$ is moved either up or down.

At the lower end of the hollow spindle $m$ a nut or female screw is secured in the tubular part of the spindle, in which the screw-spindle $p$ turns. The lower part of the screw-spindle $p$ passes through the cross-head $f$, and is provided at its lower end with the clutch $q$, and also within the cross-head $f$ with the clutch $r$.

$s$ is a stop-pin, by which the clutch $q$ can be stopped to prevent its rotation, and $t$ is a stop-pin, which, when it enters the hole in the extension of the cross-head $f$, indicates that the pin $e$ is at the proper position to receive the yarn to be tested.

When we now with a yarn-reel wind from a cop or bobbin one knot or one seventh of a hank or skein, or any other portion for which the yarn-tester has been adapted, carefully remove the yarn from the reel and place it upon the pins $d$ and $e$, and turn the crank $o$ to the right until the yarn breaks. The amount of stretch and also the strain or the exact breaking-weight will be shown on the index-plate, and all parts will retain the exact position occupied when the yarn broke, the screw-spindle $m$ retaining the cross-head $h$ in the position when the yarn broke, and the spindle $p$ holding the cross-heads $h$ and $f$ the exact distance apart at which the yarn broke.

As the hollow spindle $m$ when turned to the right enters the nut in the cross-head $h$, a strain is put on the spring $g$, and the spindle $p$ revolves with the spindle $m$ until the clutch $q$ engages and holds the spindle $p$ stationary, when the turning of the spindle $m$ allows the screw of the spindle $p$ to enter the nut in the tubular part of the spindle $m$.

When, now, the yarn stretches, the cross-head $f$ slides upward, the clutch $q$ revolves until the strain is sufficient to engage the same, and so on until all the stretch is taken out of the yarn and the yarn breaks.

To place the parts of the instrument in position for another test, the crank $o$ is turned to the left until the pin $e$ is at its lowest point, the stop-pins $s$ and $t$ are pressed in, and the crank is gently turned to the right until it stops, when the stop-pins $s$ and $t$ are released, and the instrument is in condition to receive another skein or knot of yarn to be tested.

In adjusting the instrument it should be understood that when the stop-pin $t$ enters the hole opposite the pin $e$ the said pin is in the lowest position, or at the point to receive the yarn, and that at that point the pointer $k$, indicating the amount of stretch, is above the zero mark on the index-plate, which mark will be opposite the pointer as soon as the skein or knot is properly straightened, and before stretch takes place. This part, therefore, requires no adjustment.

When, however, the instrument has been used without yarn and becomes deranged, it may be readily adjusted by turning the thumb-screw $u$ above the crank, which thumb-screw is secured to a tube, $x$, provided with a square hole at its lower end, in which the square rod $v$, secured to the spindle $p$, slides, so that by turning the thumb-screw $u$ the spindle $p$ may be turned, and the distance between the cross-heads $h$ and $f$ adjusted. While in operation the square rod $v$ slides freely in the tube $x$. The tube $x$ also serves as a lubricating device. The oil poured into the same will enter the tubular portion of screw-spindle $m$, and, by a hole at $y$, enters an oil-cup arranged on the cross-head $h$, and so lubricates the exterior and interior of the spindles and all the working parts.

All the operating parts in my improved yarn-tester are contained within the case C, and are thus protected against dust and injury. The instrument occupies but little room, is simple in construction, durable, and can be made at a less cost than yarn-testers as heretofore constructed.

Having thus described my invention, I claim as new and desire to secure by Letters Patent—

1. In a yarn-testing instrument, the combination, with the adjustable cross-head $h$, of the spring $g$ and cross-head $f$ and the pins $e$ and $d$, arranged and operated substantially as and for the purpose described.

2. The combination, in a yarn-tester, of the cross-heads $h$ and $f$, connected by the spiral spring $g$ with the index-plate $i$, arranged to indicate the length of the stretch and the breaking strength of the yarn, both or either as and for the purpose specified.

3. In a yarn-tester, the combination, with the heads $h$ and $f$ and spring $g$, of the screw-spindle $m$ and crank $o$, arranged to increase the strain on the yarn gradually, as and for the purpose set forth.

4. The combination, with the heads $h$ and $f$ and spring $g$ in a yarn-testing instrument, of the tubular screw-spindle $m$ and screw-spindle $p$, arranged to retain all the parts in the position occupied when the yarn broke, as and for the purpose described.

5. In a yarn-testing instrument, the combination, with a stationary pin and a sliding pin arranged to receive the yarn to be tested, of the spiral spring $g$, secured to the sliding pin at one end, and to a straining device on the other, operated by means of a screw, and provided with an index or indexes, so as to show the amount of stretch and the breaking-strength of the yarn, arranged and operated substantially as and for the purpose set forth.

6. The combination, with the vertically-arranged case $c$, provided with the extension supporting the pin $d$, of the pin $e$, secured to the cross-head $h$, and means, substantially as described, by which a gradual strain is exerted on the loop of yarn, and the amount of stretch, as also the breaking-strength, both or either, is indicated on a graduated index, substantially as and for the purpose specified.

JOSEPH R. BROWN.

Witnesses:
  JOSEPH A. MILLER,
  LUCIUS O. ROCKWOOD.